United States Patent
Gaillard et al.

(10) Patent No.: US 12,168,941 B2
(45) Date of Patent: Dec. 17, 2024

(54) TURBOMACHINE TURBINE HAVING A CMC NOZZLE WITH LOAD ABSORPTION AND POSITIONAL ADJUSTMENT

(71) Applicant: SAFRAN AIRCRAFT ENGINES, Paris (FR)

(72) Inventors: Aurélien Gaillard, Moissy-Cramayel (FR); Clément Emile André Cazin, Moissy-Cramayel (FR); Sébastien Serge Francis Congratel, Moissy-Cramayel (FR); Clément Jarrossay, Moissy-Cramayel (FR); Pascal Cédric Tabarin, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/555,056

(22) PCT Filed: Apr. 12, 2022

(86) PCT No.: PCT/FR2022/050689
§ 371 (c)(1),
(2) Date: Oct. 12, 2023

(87) PCT Pub. No.: WO2022/219282
PCT Pub. Date: Oct. 20, 2022

(65) Prior Publication Data
US 2024/0218801 A1  Jul. 4, 2024

(30) Foreign Application Priority Data
Apr. 12, 2021  (FR) .................................... 2103738

(51) Int. Cl.
*F01D 9/04* (2006.01)
*F01D 5/28* (2006.01)
(Continued)

(52) U.S. Cl.
CPC ............. *F01D 9/041* (2013.01); *F01D 5/282* (2013.01); *F01D 9/06* (2013.01); *F01D 25/24* (2013.01);
(Continued)

(58) Field of Classification Search
CPC ..... F01D 9/00; F01D 9/02; F01D 9/04; F01D 9/041; F01D 9/042; F01D 5/282;
(Continued)

(56) References Cited

U.S. PATENT DOCUMENTS

2016/0312658 A1   10/2016  Heitman et al.
2017/0022833 A1*   1/2017  Heitman ............... F01D 25/243

FOREIGN PATENT DOCUMENTS

EP    2443318 A1    4/2012
EP    3121379 A1    1/2017
(Continued)

OTHER PUBLICATIONS

Search Report and Written Opinion issued in International Application No. PCT/FR2022/050689, mailed Nov. 2, 2022.
(Continued)

*Primary Examiner* — Elton K Wong
(74) *Attorney, Agent, or Firm* — Bookoff McAndrews, PLLC

(57) ABSTRACT

A turbine including a casing and a nozzle including an outer metallic shroud secured to the casing, an inner metallic shroud, and a plurality of nozzle segments made of CMC forming a crown extending between the outer shroud and the inner shroud, each segment including a strut, an inner platform, an outer platform and at least one airfoil having a hollow profile traversed by the strut, wherein for
  each airfoil, the outer platform includes an axial stop extending in outward radial protrusion from the outer platform, and the outer metallic shroud comprises a
(Continued)

complementary axial stop extending in inward radial protrusion from the outer metallic shroud, the axial stop being upstream and axially bearing against the complementary axial stop, and machined with an angle of machining chosen to adjust the orientation of said at least one blade of the segment with respect to the axial direction.

4 Claims, 5 Drawing Sheets

(51) Int. Cl.
*F01D 9/06* (2006.01)
*F01D 25/24* (2006.01)

(52) U.S. Cl.
CPC .... *F05D 2220/323* (2013.01); *F05D 2230/10* (2013.01); *F05D 2240/128* (2013.01)

(58) Field of Classification Search
CPC ........ F01D 25/24; F01D 25/243; F01D 25/28; F01D 25/162; F05D 2230/10; F05D 2300/6033; F05D 2220/323; F05D 2240/128

See application file for complete search history.

(56) References Cited

FOREIGN PATENT DOCUMENTS

| | | | |
|---|---|---|---|
| FR | 2973435 | A1 | 10/2012 |
| FR | 2979662 | A1 | 3/2013 |
| FR | 3061928 | A1 | 7/2018 |
| WO | 2010061140 | A1 | 6/2010 |
| WO | 2010116066 | A1 | 10/2010 |
| WO | 2010146288 | A1 | 12/2010 |
| WO | 2011080443 | A1 | 7/2011 |

OTHER PUBLICATIONS

Search Report issued in French Application No. 2103738, mailed Feb. 4, 2022.

* cited by examiner

[Fig. 1]
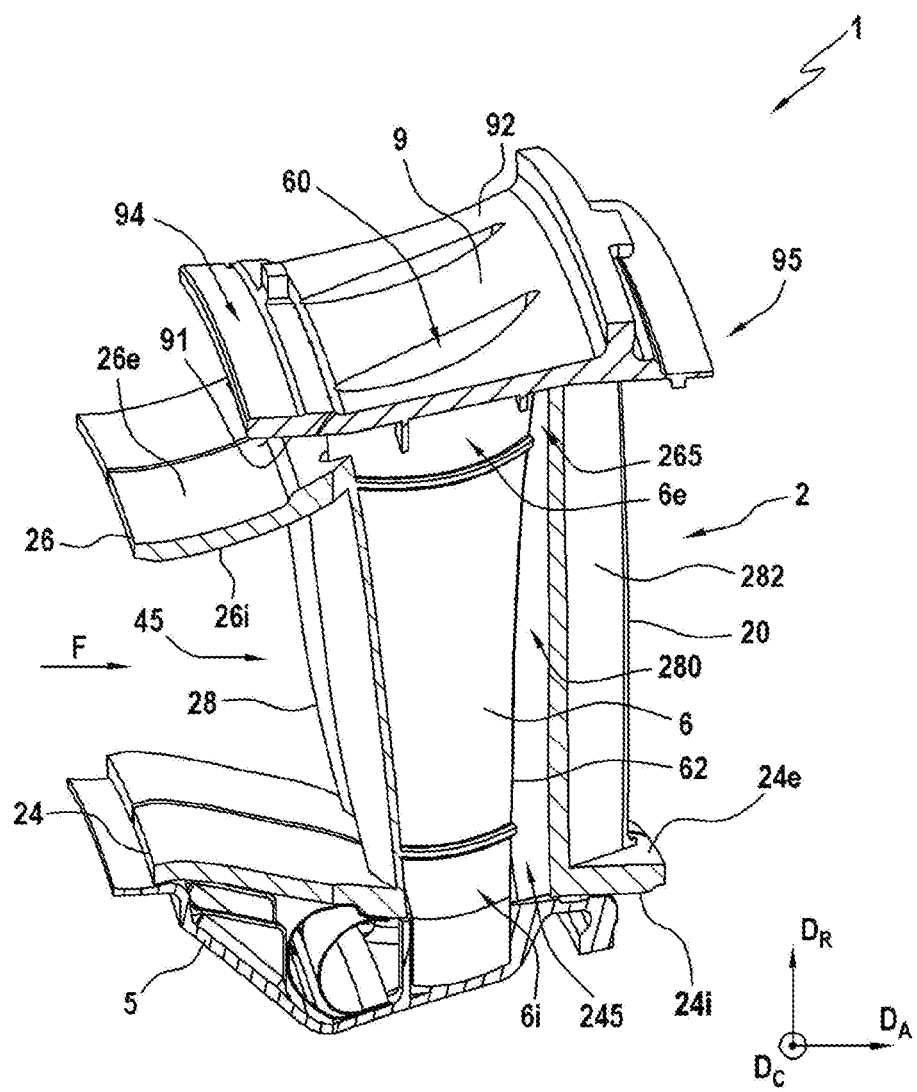

[Fig. 2]
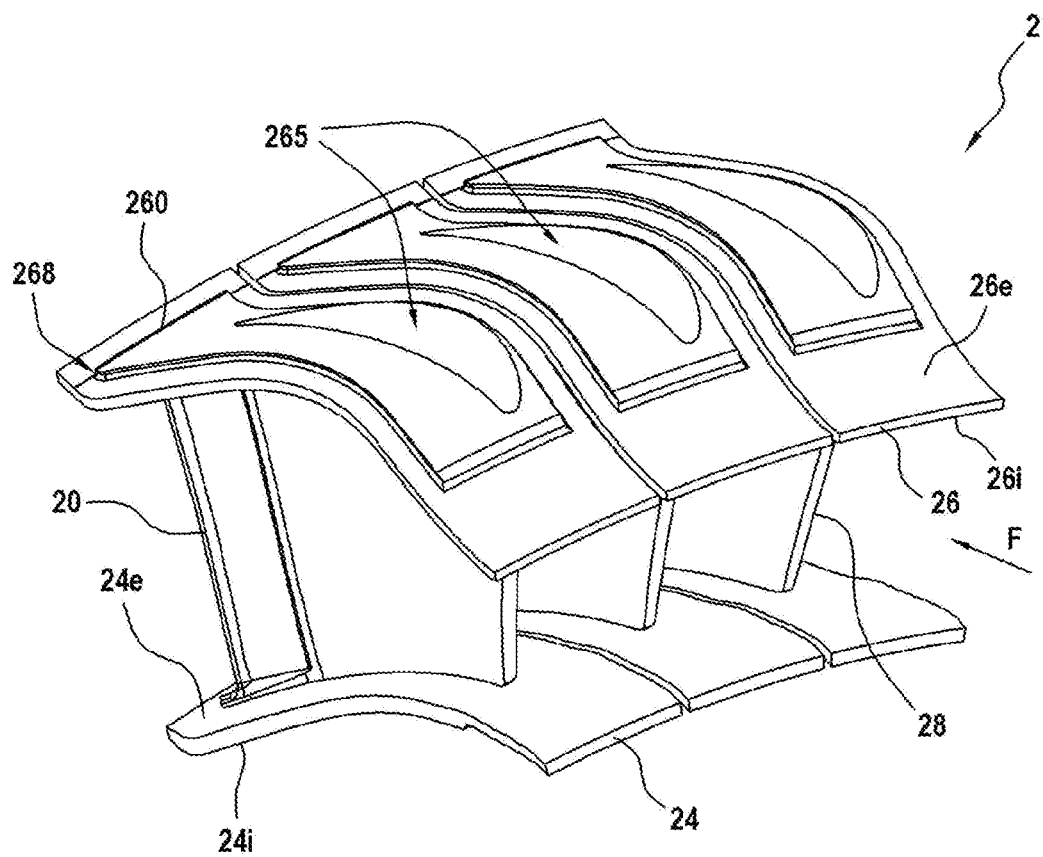

[Fig. 3]
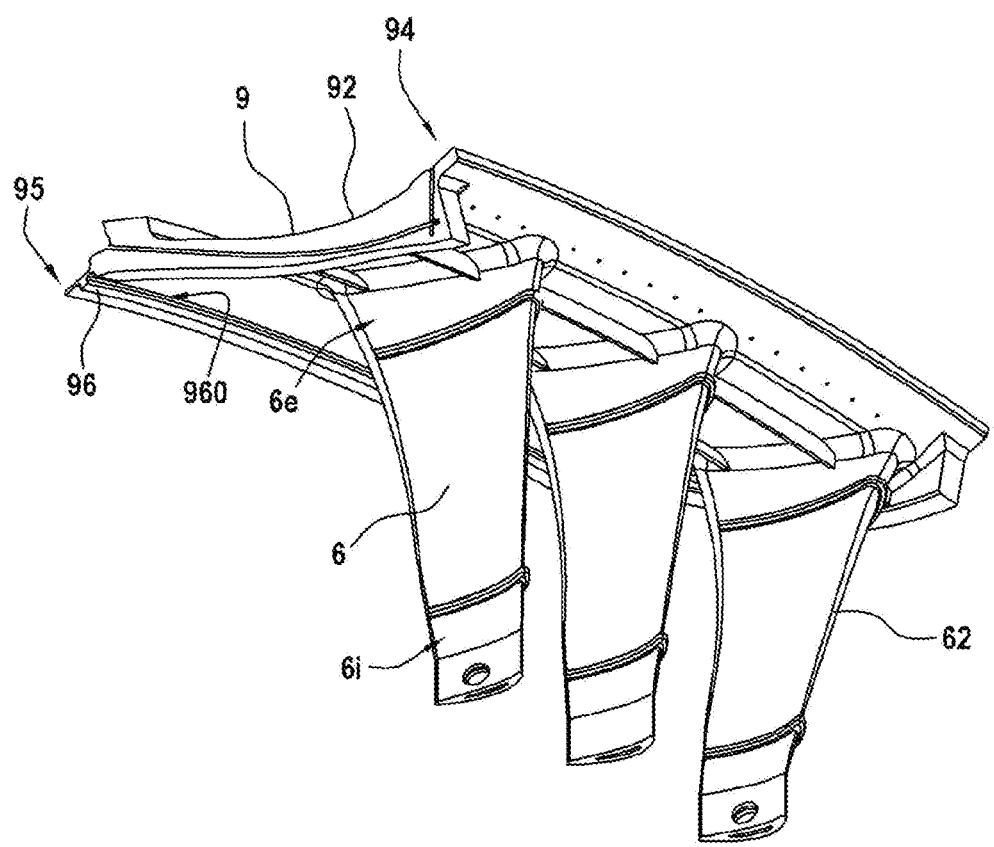

[Fig. 4]
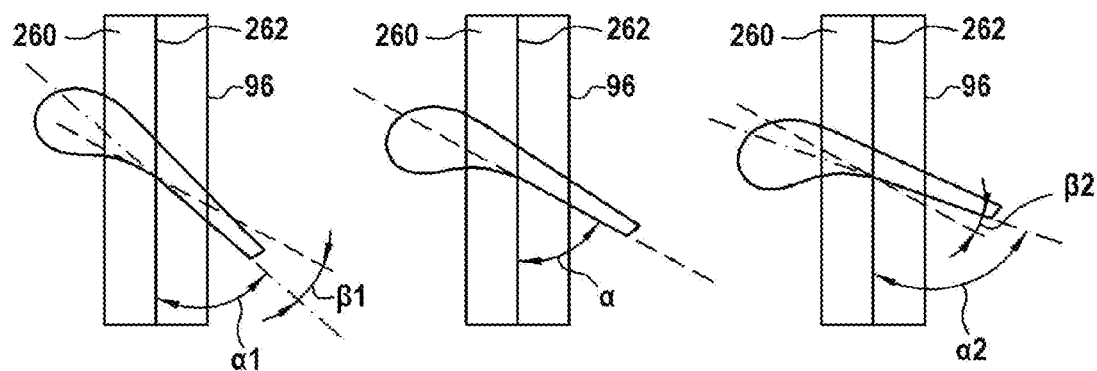
[Fig. 5]
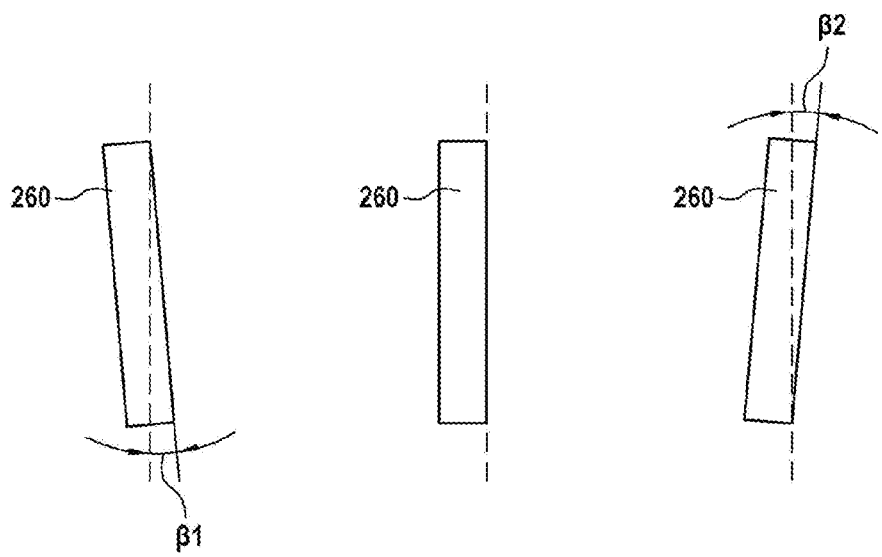

[Fig. 6]
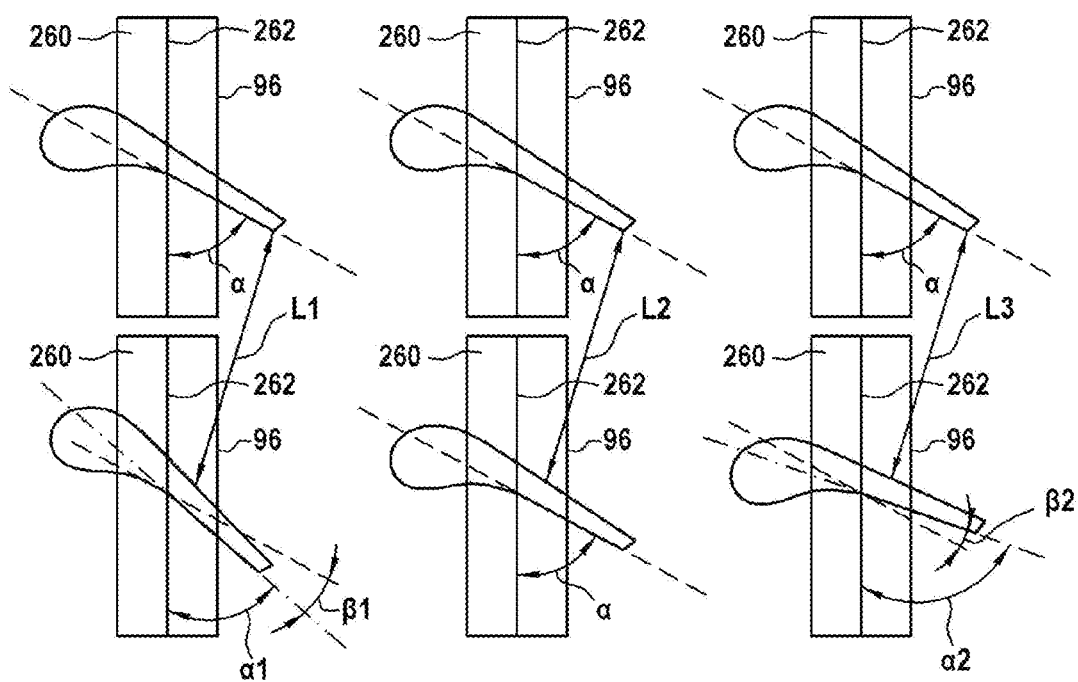

TURBOMACHINE TURBINE HAVING A CMC NOZZLE WITH LOAD ABSORPTION AND POSITIONAL ADJUSTMENT

CROSS-REFERENCE TO RELATED APPLICATIONS

This is a National Stage Application under 35 U.S.C. § 371 of International Application No. PCT/FR2022/050689, filed Apr. 12, 2022, now published as WO 2022/219282 A2, which claims priority to French Patent Application No. 2103738, filed on Apr. 12, 2021.

TECHNICAL FIELD

The invention relates to turbomachines, in particular aeronautical turbojet engines or industrial turbines comprising a turbine nozzle made of ceramic matrix composite material or with an at least partially ceramic matrix, hereinafter referred to as CMC material.

PRIOR ART

The field of application of the invention is particularly that of gas turbine aeronautical engines. The invention is however applicable to other turbomachines, for example industrial turbines.

The improvement of turbomachine performance and the reduction of their contaminating emissions leads to higher and higher operating temperatures being envisioned.

For elements of hot parts of turbomachines, provision has therefore been made for using ceramic matrix composite materials hereinafter referred to as CMC.

CMC materials are typically formed of a fiber reinforcement made of refractory fiber, such as carbon or ceramic fiber, densified by a ceramic matrix or at least partially made of ceramic.

These materials possess noteworthy thermo-structural properties, i.e. mechanical properties that make them able to form structural elements and the ability to keep these properties at high temperatures. In addition, CMC materials have a much lower mass per unit volume than the metallic materials conventionally used for elements of hot parts of turbomachines.

Thus, the documents WO 2010/061140, WO 2010/116066 and WO 2011/080443 describe the production of blades of turbomachine impellers made of CMC with built-in platforms and heels. Provision has also been made for the use of CMC materials for turbine nozzles, particularly in the documents WO 2010/146288, FR 2 979 662 and EP 2 443 318.

A conventional metallic turbine nozzle has a crown shape composed of several assembled segments, each segment comprising an inner platform, an outer platform and a plurality of airfoils extending between the inner and outer platforms and attached to them. The juxtaposed inner platforms form an inner shroud and the juxtaposed outer platforms form an outer shroud. The inner and outer shrouds delimit the gas flow path in the nozzle.

Introducing a nozzle, for example a high-pressure nozzle, made of CMC makes it possible to increase the maximum temperature tolerated by comparison with a metallic nozzle, and thus to reduce the quantity of cooling air used. This makes it possible to improve the performance of the turbomachine.

However, CMC, due to having different properties to metal, is more sensitive to certain mechanical stresses. Specifically, CMC has greater stiffness and lower expansion. It behaves better under compression, but its allowable tensile stresses are lower than those of metal.

In addition, the integration of a CMC part into a metallic environment is difficult due to the differential thermal expansion between CMC and metal. This is even more complex in a turbomachine, and especially in a high-pressure part of the turbomachine, since the environment is hot, which exacerbates the differences in thermal expansion coefficient between the materials, the aerodynamic loads experienced by a high-pressure nozzle also being higher in this turbine area.

Nozzles made of CMC are known, such as for example a turbine nozzle including an outer support shroud secured to a casing, an inner support shroud, and a plurality of nozzle segments made of CMC forming a crown extending between the outer support shroud and the inner support shroud. Each nozzle segment bears on the inner and outer support shrouds and includes an inner platform, an outer platform, and at least one airfoil extending between the outer platform and the inner platform and attached to them.

However, there is a need for improving the known solutions as regards the deterministic retainment of the CMC nozzle segment with the inner shroud, particularly in terms of axial retainment of the nozzle segment and in terms of absorption of the aerodynamic loads.

Moreover, a significant pressure differential is exerted on the casing under the nozzle in the radial and axial directions. This casing serves to create a seal between the rotor and the stator. This pressure difference is the source of a load which, if it was exerted on the CMC, would be high given the allowable stresses of the material.

Also known, particularly from the document FR 3 061 928 and FR 2 973 435, is a nozzle as described above and further including a reinforcing strut extending radially inward of the blades between the two platforms allowing the nozzle to be retained on the casing by the strut.

However, such a solution absorbs, via the strut, both the loads related to the pressure differential under the nozzle and the aerodynamic loads on the CMC crown. Furthermore, for the reasons described above relating to the different mechanical behavior between CMC and metallic materials, it is difficult to position the CMC part on the metallic environment by flanging it.

During the operation of the turbine, a significant radial clearance is generated between the strut and the airfoil that it traverses. More specifically, since the expansion of the strut is greater than the expansion of the CMC airfoil, a radial clearance greater than 0.5 mm, or even greater than 1 mm, may appear between the strut and the airfoil that it traverses. This radial clearance generates an uncertainty on the position of the airfoil, with the aerodynamic downforce becoming random upward or downward according to the radial resultant load of the aerodynamic load.

In an entirely metallic nozzle, the nozzles are usually foundry-cast and several airfoils form a single nozzle (often duplets or triplets, i.e. two or three airfoils per ring segment). In this case the through section is controlled and replicable due to the manufacturing process.

This is no longer the case when the blades are made of CMC material integrated into a metallic environment, for several reasons. Firstly, due to the lack of control of the tolerances on CMC parts, due to the fact that the CMC material airfoil is not positionally stressed to avoid damaging it, and due to the contact between the CMC material airfoil and the metallic strut which absorbs the loads.

There is therefore a need to improve the deterministic retainment of the CMC nozzle of this solution.

SUMMARY OF THE INVENTION

The invention aims to palliate the abovementioned drawbacks and to overcome the difficulties mentioned above by making provision for a turbomachine turbine comprising a turbine nozzle at least partly made of CMC, the installation of which is simplified and adapted to retain its nozzle segments deterministically while allowing the segments to deform independently of the metallic interface parts, while also guaranteeing a satisfactory seal.

The invention also has the aim of allowing the adjustment of the axial positioning of the airfoil on the upper shroud.

A subject of the invention makes provision for a turbomachine turbine comprising a casing, an outer support shroud made of metal secured to the casing and defining an axial direction and a radial direction, an inner support shroud made of metal, an annular turbine nozzle including a plurality of nozzle segments made of ceramic matrix composite material forming a crown extending between the outer support shroud and the inner support shroud.

Furthermore, each segment includes an inner platform, an outer platform and at least one airfoil extending radially between the inner and outer platforms and having a hollow profile defining an inner housing extending radially, and the turbine further comprising, for each segment, at least one strut secured to the metallic shroud and radially traversing the segment via the housing of an airfoil.

According to a general feature of the invention, for each segment, the outer platform comprises a radially outer surface facing the outer metallic shroud and an axial stop extending in radial protrusion from the radially outer surface of the outer platform, and the outer metallic shroud comprises a radially inner surface facing the outer platform and a complementary axial stop extending in radial protrusion from the radially inner surface of the outer metallic shroud, the axial stop bearing along the axial direction against the complementary axial stop and located upstream of the complementary axial stop with respect to the direction of the stream of air intended to flow through the turbine, and the surface of the axial stop in contact with the complementary axial stop having an angle of machining with respect to a plane orthogonal to the axial direction, the angle of machining being chosen to adjust the orientation of said at least one blade of the segment with respect to the axial direction.

The invention thus makes provision for a solution for controlling the through section of the flow through the flow path in a nozzle comprising an assembly of hollow CMC airfoils traversed by metallic struts despite retainment in an unstressed position.

The plane bearing, i.e. between two plane surfaces, between the nozzle segment and the outer metallic shroud secured to the strut makes it possible to dispense with the degree of freedom of rotation about a radial axis of the nozzle ring with respect to its support structure formed in particular by the outer metallic shroud 9 and the casing and to moreover dispense with the degree of freedom of translation along the axial direction $D_A$, i.e. along the engine centerline. This makes it possible to ensure the retainment of the nozzle in position and thus to control the through section of the nozzle in operation and to possess a through section which is replicable airfoil by airfoil, since the contact surface of the axial stop is machined to ensure that this is the case.

According to a first aspect of the turbine, the struts and the outer metallic shroud may be made as a single part.

The proposed configuration makes it possible to control the through section of the hollow CMC material airfoil positioned on a metallic strut despite its retainment in an unstressed position.

According to a second aspect of the turbine, the struts and the outer metallic shroud may be made as a single part.

This makes it possible to limit as much as possible any leaks that might be present in the case of a segmented shroud or struts added on to the outer shroud.

According to a third aspect of the turbine, the outer metallic shroud may comprise, along the axial direction, an upstream end and a downstream end, the complementary axial stop being located on the downstream end.

According to a fourth aspect of the turbine, the strut may be hollow.

The strut thus makes it possible to convey air into the cavity radially inward of the inner shroud in order to pressurize it and thus avoid the air circulating in the flow path extending between the inner and outer platforms of the nozzle segments from being reintroduced outside this flow path and thus reducing the performance and increasing the risk of the parts overheating.

Another subject of the invention is a turbomachine comprising a turbomachine turbine as defined above.

The invention also has the subject of an aircraft comprising at least one turbomachine as defined above.

The invention also has the subject of a method for manufacturing a turbomachine turbine as defined above, the method comprising a first step of forming the ring made of ceramic matrix composite material, then a second step of controlling the profile of the ring thus formed, then a third step of determining an angle of machining of the surface of the axial stop in contact with the complementary axial stop to adjust the orientation of said at least one blade with respect to the axial direction, and a fourth step of machining the surface of the axial stop in contact with the complementary axial stop at the determined angle, and a fifth step of assembling the turbine.

BRIEF DESCRIPTION OF THE DRAWINGS

FIG. 1 is a schematic section view of a segment of a turbine according to an embodiment of the invention.

FIG. 2 is a schematic perspective top view of a ring segment of the turbine of FIG. 1.

FIG. 3 shows a schematic perspective bottom view of an outer support shroud of the turbine of FIG. 1.

FIG. 4 schematically represents the angle formed by the airfoil before the machining of the bearing surface of the axial stop for three different examples.

FIG. 5 shows, for the three configurations of FIG. 4, the angle of machining of the axial stops of the airfoils.

FIG. 6 schematically represents the differences in through section between two airfoils for the three configurations of FIG. 4.

DESCRIPTION OF THE EMBODIMENTS

FIG. 1 illustrates a schematic section view of a segment of a turbine according to an embodiment of the invention. A high-pressure turbine 1 of a turbomachine, for example an aeronautical turbojet engine, as partially shown in FIG. 1, comprises a plurality of fixed nozzles 2 which alternate with impellers in the direction of flow of the of the gas stream F, indicated by an arrow in FIG. 1, in the turbine 1 and which are installed in a turbine casing.

Each impeller comprises a plurality of blades having an inner shroud, and at least one airfoil extending from the inner shroud and linked to it. On the inner side of the inner shroud, the blade extends in a root engaged in a housing of a disc. On the outer side, the tip of each blade faces an abradable material borne by a ring to provide the seal at the blade tips.

Throughout this text, the terms "inner" or "internal" and "outer" or "external" are used with reference to the position or the orientation with respect to the axis of rotation of the turbine 1 which defines the axial direction $D_A$ of the turbine 1.

The blades of the impeller can be conventional metallic blades or blades made of CMC material obtained for example as described in the documents WO 2010/061140, WO 2010/116066, and WO 2011/080443.

At least one of the nozzles 2 of the turbine 1 is formed by joining several annular nozzle segments 20 made of CMC material to form an entire ring. The arrow $D_A$ indicates the axial direction of the nozzle 2 while the arrow $D_R$ indicates the radial direction of the nozzle 2 and the reference $D_C$ indicates the circumferential direction.

Each nozzle segment 20 of the nozzle 2 comprises an inner platform 24, an outer platform 26 and an airfoil 28 extending between the inner and outer platforms 24 and 26 and attached to them. In a variant, several airfoils could extend between the inner and outer platforms of one and the same nozzle segment. Once assembled with the casing of the turbine 1, the segments 20 form a single crown of nozzles 2 having an inner shroud formed by the juxtaposition of the inner platforms 24 of the segments 20 and an outer shroud formed by the juxtaposition of the outer platforms 26 of the segments 20.

The inner shroud and the outer shroud together form a fluid flow path 45 inside which the gas stream F flows during the operation of the turbine 1.

Throughout the text, the terms "upstream" and "downstream" are used with reference to the direction of flow of the gas stream F in the path 45 indicated by an arrow.

The inner platforms 24 each have an outer surface 24e intended to be in contact with the gas stream F, and therefore radially disposed facing the outer platforms 26 forming the outer shroud. The inner platforms 24 moreover have an inner surface 24i disposed facing the axis of rotation of the turbine 1.

The outer platforms 26 each have an outer surface 26e disposed facing the radially outer casing. The outer platforms 26 moreover have an inner surface 26i intended to be in contact with the gas stream F, and therefore radially disposed facing the inner platforms 24 forming the inner shroud and facing the axis of rotation of the turbine 1.

The nozzle 2 is retained between an inner metallic shroud 5 and an outer metallic shroud 9 between which extends the crown formed by the assembly of the ring segments 20 of the nozzle 2. The outer metallic shroud 9 is secured to the casing and has an inner surface 91 and an outer surface 92 along the radial direction $D_R$.

As illustrated in FIG. 1, and also in FIG. 2 which shows a schematic top perspective view of a nozzle segment 20, each airfoil 28 has a hollow profile having an inner housing 280 extending over the entire height of the airfoil 28, i.e. between the inner platform 24 and the outer platform 26 of the ring segment 20. The inner platform 24 of each nozzle segment 20 comprises an orifice 245 the shape of which corresponds to the section of the inner housing 280 in the plane wherein the inner platform 24 extends. Similarly, the outer platform 26 of each nozzle segment 20 comprises an orifice 265 the shape of which corresponds to the section of the inner housing 280 in the plane wherein the inner platform 26 extends. The orifices 245 and 265 of the inner 24 and outer 26 platforms are made in the extension of the inner housing 280 of the airfoil 28.

The inner housing 280 of the airfoil 28 and the orifices 245 and 265 of the inner 24 and outer 26 platforms may be connected to a cooling system delivering a stream of cooling air from the casing into the airfoil 28 and the inner 24 and outer 26 platforms.

As illustrated in FIG. 1 and in FIG. 3 which shows a schematic bottom perspective view of an outer support shroud 9, the outer support shroud 9 comprises, for each nozzle segment 20, a strut 6 extending in the radial direction $D_R$ from the inner surface 91 of the outer metallic shroud 9.

As illustrated, the strut 6 comprises a rod 62 extending in protrusion from the head 61 in the radial direction $D_R$ inward and configured to traverse the outer metallic shroud 9, the inner housing 280 of the airfoil 28 and the orifices 245 and 265 of the inner 24 and outer 26 platforms being aligned with the inner housing 280 of the airfoil 28.

In other words, the strut 6 comprises a first radially inward end 6i and a second radially outer end 6e, a body 62 extending substantially along the radial direction $D_R$ between the first and second ends 6i and 6e of the strut 6.

The strut 6 is hollow to convey air into the cavity radially inward of the inner shroud in order to pressurize it and thus avoid the air circulating in the flow path extending between the inner and outer platforms of the nozzle segments from being reintroduced outside this flow path and thus reducing the performance and increasing the risk of the parts overheating. The strut 6 thus comprises an inner housing 60 extending in the radial direction $D_R$ between the first and second ends 6i and 6e of the strut 6.

The outer metallic shroud 9 comprises an upstream end 94 and a downstream end 95 along the axial direction $D_A$. On its downstream end 95, the outer metallic shroud 9 comprises a shoulder 96 extending radially inward from the inner surface 91 of the outer metallic shroud 9 over the entire circumference of the outer metallic shroud 9, and forming a bearing surface 960 along the axial direction $D_A$, the bearing surface 960 of the outer metallic shroud being oriented along the axial direction $D_A$ face-to-face with the flow of the stream F, in other words facing upstream.

The outer platform 26 comprises an axial stop 260 extending radially outward from the outer surface 26e of the outer platform 26, the axial stop 260 having an axial bearing surface 262 oriented along the axial direction $D_A$ along the direction of flow of the stream F, i.e. facing downstream. The axial bearing surface 262 of the axial stop 260 is thus facing, and even in contact with, the bearing surface 960 of the shoulder 96 of the outer metallic shroud 9.

To ensure that each segment 20 of the annular nozzle 2 has the same through section between these airfoils 28, the orientation of the airfoils with respect to the axial direction $D_A$ is adjusted by machining, during the assembly of the turbine 1, the axial bearing surface 262 of the axial stop 260, before finalizing the assembly of the nozzle 2 with the outer metallic shroud 9.

As illustrated in FIG. 4, during the formation of the CMC material ring segments 20, the segments 20 may slightly vary from one another and have slight differences in the angle α formed, in a plane orthogonal to the radial direction $D_R$, between the axial bearing surface 262 of the axial stop 260 and the direction of the airfoil 28, particularly the direction of a trailing edge 282 of the airfoil 28. In FIG. 4, three different angles $\alpha_1$, $\alpha$ and $\alpha_2$ are thus observed, with in particular the size relationship $\alpha_1 \ll \alpha_2$. In FIG. 4, the direction of the reference airfoil 28 forming the angle $\alpha$ is shown in dashes each time, while the directions of the actual airfoils 28 are shown in dot-and-dash lines for the two airfoils having an angle $\alpha_1$ and an angle $\alpha_2$. The difference between the actual angle ($\alpha_1$ and $\alpha_2$) and the reference angle $\alpha$ forms an angle of variation respectively denoted $\beta_1$ and $\beta_2$.

As illustrated in FIG. 5, the variation in the direction of the airfoils 28 gives rise to a variation in the distance L between the airfoils 28, and therefore of the through section. FIG. 5 shows three pairs of segments in which the top airfoil always has the same direction of the trailing edge, in this case a direction forming the reference angle $\alpha$ with the axial bearing surface 262 of the axial stop 260 of the outer platform 26, and the bottom airfoil having a direction forming first the angle $\alpha_1$, then the same reference angle $\alpha$ then the angle $\alpha_2$. This has the consequence of obtaining three different lengths L, $L_1$ and $L_2$ between the airfoils of the three pairs, and thus three different through sections.

To offset any such variations and adjust the orientation of the segments 20 and therefore of the airfoils 28, the axial bearing surface 262 of the axial stops 260 of the outer platforms 26 is machined with an angle corresponding to said angle of variation $\beta_1$ or $\beta_2$ for example, as illustrated in FIG. 6 which shows three different axial stops 260 in top view.

Furthermore, the internal support shroud 5 comprises orifices configured to receive the struts 6. The strut 6 provides a means for attaching the CMC nozzle segment 20 from the top, while minimizing the bending moment, insofar as the bending length is reduced by approximately half due to the strut 6 traversing the nozzle segment. Each nozzle segment 20 is thus retained deterministically, i.e. in such a way as to avoid the nozzle segment 20 from starting to vibrate and by controlling its position, while also allowing the nozzle segment 20 to deform under the effects of temperature and pressure inter alia, independently of the metallic interface parts.

If each nozzle segment were to comprise several airfoils, the turbine would comprise, at the most, a corresponding number of struts for each nozzle segment.

The turbomachine turbine according to the invention comprises a turbine nozzle at least partly made of CMC, the installation of which is simplified and adapted to retain its nozzle segments deterministically while allowing the segments to deform independently of the metallic interface parts, and while improving the seal between the strut and the outer metallic shroud.

The invention claimed is:

1. A method for manufacturing a turbomachine turbine, wherein the turbomachine turbine comprises a casing, an outer support shroud made of metal secured to the casing and defining an axial direction and a radial direction, an inner support shroud made of metal, an annular turbine nozzle including a plurality of nozzle segments made of ceramic matrix composite material forming a crown extending between the outer support shroud and the inner support shroud, each segment including an inner platform, an outer platform and at least one airfoil extending radially between the inner and outer platforms and having a hollow profile defining an inner housing extending radially, and the turbine further comprising, for each segment, at least one strut secured to the outer metallic support shroud and radially traversing the segment via the housing of an airfoil, for each segment, the outer platform comprising a radially outer surface facing the outer metallic shroud and an axial stop extending in radial protrusion from the radially outer surface of the outer platform, and the outer metallic shroud comprises a radially inner surface facing the outer platform and a complementary axial stop extending in radial protrusion from the radially inner surface of the outer metallic shroud, the axial stop bearing along the axial direction against the complementary axial stop and located upstream of the complementary axial stop with respect to the direction of a stream of air intended to flow through the turbine, and a surface of the axial stop in contact with the complementary axial stop having an angle of machining with respect to a plane orthogonal to the axial direction, the angle of machining being chosen to adjust an orientation of said at least one airfoil of the segment with respect to the axial direction, and wherein the annular turbine nozzle is formed of the ceramic matrix composite material in a first step, then the orientation of the at least one airfoil is controlled in a second step, then the angle of machining of the surface of the axial stop in contact with the complementary axial stop is determined to adjust the orientation of said at least one airfoil with respect to the outer metallic shroud in a third step, the surface of the axial stop in contact with the complementary axial stop is machined in a fourth step, and the annular turbine nozzle is assembled on the outer and inner support shrouds and on the casing of the turbine in a fifth step.

2. The method as claimed in claim 1, wherein the struts and the outer metallic shroud are made as a single part.

3. The method as claimed in claim 1, wherein the outer metallic shroud comprises, along the axial direction, an upstream end and a downstream end, the complementary axial stop being located on the downstream end.

4. The method as claimed in claim 1, wherein the strut is hollow.

* * * * *